(12) United States Patent
Lortz et al.

(10) Patent No.: US 6,991,190 B2
(45) Date of Patent: Jan. 31, 2006

(54) PROCESS FOR PRODUCING DISPERSIONS

(75) Inventors: Wolfgang Lortz, Waechtersbach (DE);
Christoph Batz-Sohn, Hanau (DE);
Bernd Penth, Lebach (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/357,391

(22) Filed: Feb. 4, 2003
(Under 37 CFR 1.47)

(65) Prior Publication Data

US 2003/0230652 A1      Dec. 18, 2003

(30) Foreign Application Priority Data

Feb. 5, 2002   (DE) ................. 102 04 470

(51) Int. Cl.
*B02C 19/06*   (2006.01)

(52) U.S. Cl. ............... 241/5; 241/16; 241/39; 241/40; 241/57; 241/DIG. 14

(58) Field of Classification Search ............ 241/5, 241/16, 39, 40, 57, DIG. 14
See application file for complete search history.

(56) References Cited

U.S. PATENT DOCUMENTS

| | | | |
|---|---|---|---|
| 5,507,439 A * | 4/1996 | Story ................. | 241/5 |
| 5,810,266 A * | 9/1998 | Nyssen et al. ......... | 241/5 |
| 5,967,964 A * | 10/1999 | Hattori et al. ........ | 516/81 |
| 6,398,404 B1 | 6/2002 | Karasawa | |
| 6,582,508 B2 * | 6/2003 | Dietz et al. ........... | 106/493 |
| 2002/0109025 A1 * | 8/2002 | Vemuri et al. ......... | 241/5 |

FOREIGN PATENT DOCUMENTS

| | | |
|---|---|---|
| DE | 199 82 217 | 10/1999 |
| EP | 0 766 997 | 4/1997 |

* cited by examiner

*Primary Examiner*—Derris H. Banks
*Assistant Examiner*—Jason Y. Pahng
(74) *Attorney, Agent, or Firm*—Oblon, Spivak, McClelland, Maier & Neustadt, P.C.

(57) ABSTRACT

A finely divided, stable dispersion of a solid is produced by: spraying at least two streams of a preliminary dispersion, each through a separate nozzle by pumps, onto a collision point in a reactor chamber enclosed by a reactor housing; passing water vapor through an opening into the reactor chamber so that a vaporous atmosphere consisting mainly of water vapor prevails in the reactor chamber; and removing the finely divided dispersion and a) vapor, b) partially condensed vapor consisting mainly of water or c) a combination of a) and b) from the reactor chamber by excess pressure of an incoming water vapor on the gas inlet side; wherein the solid has an average particle size of from 10 nm to 10 $\mu$m.

18 Claims, 1 Drawing Sheet

PROCESS FOR PRODUCING DISPERSIONS

BACKGROUND OF THE INVENTION

1. Field of the Invention

Figure 1:
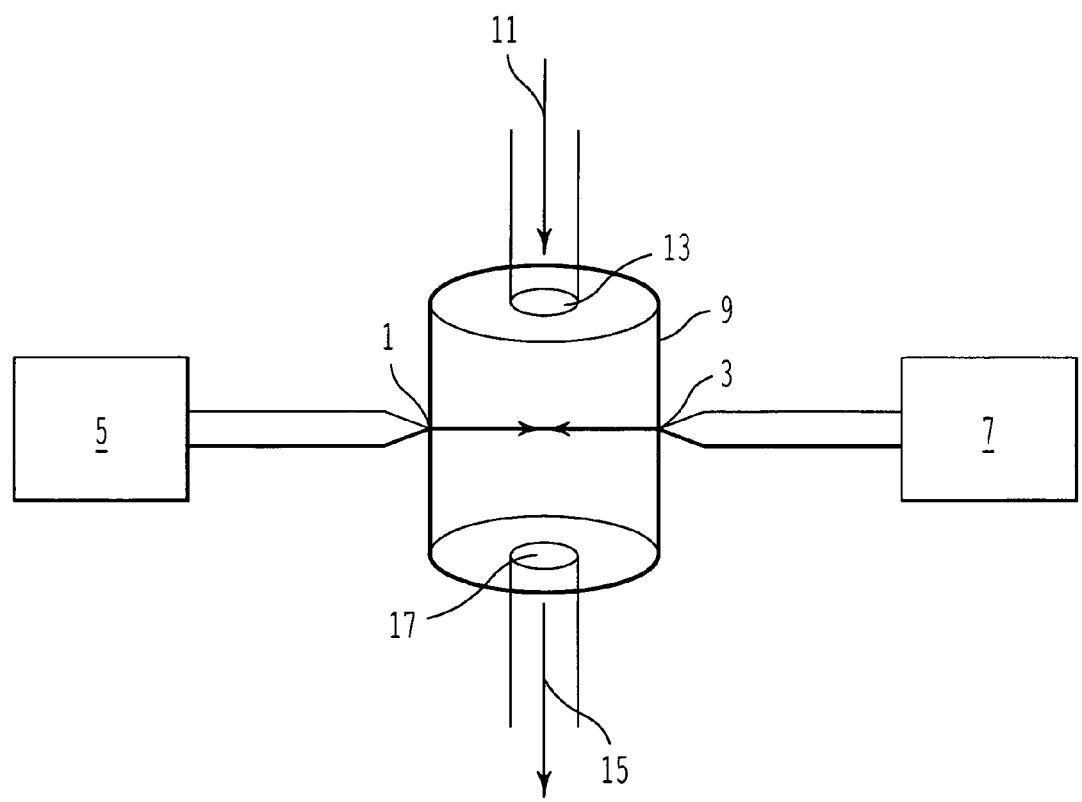

This invention relates to a process for producing a finely divided dispersion of a solid having an average particle size of 10 nm to 10 µm, by collision of a preliminary dispersion under high pressure, in an atmosphere of water vapor.

2. Description of the Related Art

Devices such as ball mills or agitated ball mills are available for the production of finely divided dispersions. A disadvantage of these devices is the abrasion of the grinding media, for example, materials made of glass, ceramic, metal or sand. This abrasion restricts the use of the dispersions thus produced in fields where only small amounts of impurities are tolerated, such as for example, the polishing of sensitive surfaces.

Higher energy inputs are possible using a planetary kneader/mixer. The efficiency of this system is dependent, however, on the mixture being processed having a sufficiently high viscosity in order to introduce the high shear energies necessary for the dispersion of the particles.

Very finely divided dispersions can be produced using high-pressure homogenizers wherein a preliminary dispersion under high pressure strikes the armored wall regions of a chamber. It has become apparent, however, that the chamber of such a device, despite the armor, is subject to severe wear. The division of the preliminary dispersion into two streams, which are released through a nozzle and meet one another precisely, lessens the abrasion but does not solve the problem. In particular, the nozzles are subject to a high stress and centering of the preliminary dispersions directed towards one another is difficult.

The abrasion during the production of dispersions is clearly decreased if the divided streams of the preliminary dispersion are released under high pressure onto a common collision point which is located in a gas-filled reaction chamber. The cavitation on material walls is minimized as a result of this arrangement. This is unlike the high-pressure devices described above, which operate in a reaction chamber filled with liquid. In the process, the gas flow also assumes the task of transporting the dispersion out of the reaction chamber and of cooling the dispersion.

A disadvantage of this process is the working-up of the gas-dispersion mixtures. To achieve economically rational throughputs, large quantities of gas have to be used. The separation of this gas requires increased expenditure on apparatus such as, for example, appropriately dimensioned degassers. The thermal conductivity, lowered by reason of the high gas content, requires larger dimensioned and hence costlier cooling devices for cooling of the mixture which may optionally be required. This process is particularly disadvantageous in cases where surface-active substances are added to the preliminary dispersion as dispersing agents. The introduction of gas can give rise to an undesirable foaming, which may greatly impede the working-up of the dispersion. The addition of defoaming agents is unsuitable for many dispersion applications, as these additives may have adverse effects during the application of dispersions.

SUMMARY OF THE INVENTION

It is an object of the present invention to provide a process for producing a finely divided dispersion of a solid in which the wear on the dispersing device and the introduction of impurities through abrasion are kept to a minimum and which allows a simple and economic isolation of the dispersion.

This and other objects have been achieved by the present invention the first embodiment of which includes a process for producing a finely divided, stable dispersion of a solid, comprising:

spraying at least two streams of a preliminary dispersion, each through a separate nozzle by pumps, onto a collision point in a reactor chamber enclosed by a reactor housing;

passing water vapor through an opening into said reactor chamber so that a vaporous atmosphere consisting mainly of water vapor prevails in said reactor chamber; and removing the finely divided dispersion and a member selected from the group consisting of a) vapor, b) partially condensed vapor consisting mainly of water and c) a combination of a) and b) from said reactor chamber by excess pressure of an incoming water vapor on the gas inlet side;

wherein said solid has an average particle size of from 10 nm to 10 μm.

BRIEF DESCRIPTION OF THE DRAWINGS

The FIGURE shows an embodiment of the invention in which streams of a dispersion of solid particles meet at a collision point to produce the finely divided solids product of the invention.

DETAILED DESCRIPTION OF THE INVENTION

The present invention provides a process for producing a finely divided, stable dispersion of solids having an average particle size of 10 nm to 10 μm. The average particle size of the solids includes all values and subvalues therebetween, especially including 100, 200, 300, 400, 500, 600, 700, 800, 900, 1000 nm, 2 μm, 3 μm, 4 μm, 5 μm, 6 μm, 7 μm, 8 μm and 9 μm. As shown in the FIGURE, at least two streams of a preliminary dispersion are each sprayed through a separate nozzle 1 and 3 by pumps 5 and 7, preferably high-pressure pumps, onto a collision point in a reactor chamber enclosed by a reactor housing 9. Water vapor 11 is passed through an opening 13 into the reaction chamber so that a vaporous atmosphere consisting mainly of water vapor prevails in the reaction chamber. The finely divided dispersion and the vapor and/or the partially condensed vapor consisting mainly of water 15 are removed from the reaction chamber by excess pressure of the incoming water vapor on the gas inlet side at exit port 17.

In context of the present invention, "stable" means that the dispersed solids do not precipitate for a relatively long period, usually for at least one month, after the dispersion.

The process according to the present invention includes the comminution, deagglomeration and disaggregation of the solids.

By "preliminary dispersion" is meant a dispersion having an average particle size of 1 mm at most. The average particle size of the preliminary dispersion includes all values and subvalues between 0.01 mm and 1 mm, especially including 0.02, 0.03, 0.04, 0.05, 0.06, 0.07, 0.08, 0.09, 0.1, 0.2, 0.3, 0.4, 0.5, 0.6, 0.7, 0.8 and 0.9 mm.

The composition of the vapor in the interior of the reactor consists of water vapor, as well as organic compounds in the preliminary dispersion, with water vapor being the main component.

The preliminary dispersion may contain solely water as the liquid phase. The preliminary dispersion may also be an aqueous dispersion which, in addition to water as the main component of the liquid phase, also contains an organic compounds or solvent which is soluble in water. Preferred are monohydric or dihydric alcohols, such as ethanol or ethylene glycol. The solubility of the particles to be dispersed in the liquid phase is preferably less than 0.1 wt. %. The solubility of the particles includes all values and subvalues between 0 and 0.1 wt. %, especially including 0.01, 0.02, 0.03, 0.04, 0.05, 0.06, 0.07, 0.08 and 0.09 wt. %.

The preliminary dispersion may further contain the dispersing agents and/or surface-active substances known to the person skilled in the art. Examples of these are given in Ullmann's Encyclopedia of Industrial Chemistry, Vol. A8, pages 586 to 599, 5th edition.

The solids content of the preliminary dispersion used in the process according to the invention may be varied within wide limits of between 1 and 70 wt. %, preferably between 10 and 50 wt. %; and particularly preferably between 20 and 40 wt. %. The solids content includes all values and subvalues therebetween, especially including 5, 10, 15, 20, 25, 30, 35, 40, 45, 50, 55, 60 and 65 wt. %. It is not necessary that the preliminary dispersion is stable. Without the action of a dispersing device, precipitation of the solid may occur within a short time. For the process according to the invention, however, it is advantageous to use the preliminary dispersion immediately after preparing.

The water vapor entering the reaction chamber may be at a temperature corresponding at least to the boiling point of water at the pressure prevailing on the gas inlet side.

Preferably, the pressure in the reactor chamber, without introduction of water vapor, can be at atmospheric pressure and the incoming water vapor can be at a temperature of 100° C. or more.

In the process according to the present invention, the preliminary dispersion may be sprayed into the reaction chamber under a pressure of at least 50 bar, preferably more than 500 bar, particularly preferably of 1000 to 4000 bar. The pressure includes all values and subvalues therebetween, especially including 200, 400, 600, 800, 1000, 1200, 1400, 1600, 1800, 2000, 2200, 2400, 2600, 2800, 3000, 3200, 3400, 3600 and 3800 bar.

Dispersion, vapor and/or condensed vapor may be cooled after leaving the reactor chamber. Heat exchangers such as, for example, plate heat exchangers or tubular heat exchangers, are suitable for this purpose.

In the process according to the present invention, a preferable solids content of the finely-divided dispersion can be established from the concentration of the solid in the preliminary dispersion and from the calculated quantity of condensed water vapor after leaving the reactor chamber.

In the process according to the present invention, the mixture of finely divided dispersion and vapor and/or condensed vapor obtained after leaving the reaction chamber, as such or mixed with a preliminary dispersion, can be sprayed repeatedly into the reaction chamber. A repeated passage may result in smaller particle sizes in the dispersion.

The solids may be organic particles, inorganic particles and/or mixtures thereof. Organic particles preferably include, for example, organic pigments, powder coating resins or polymer particles. Inorganic particles preferably include, for example, inorganic pigments, abrasives, fillers, ceramic materials or carbon blacks.

To carry out the process according to the present invention, a device is used in which at least two nozzles are provided, each with an allocated pump and supply line for spraying the preliminary dispersion onto a common collision point in a reactor chamber surrounded by a reactor housing. In addition, the reactor housing has an opening through which water vapor is introduced and an opening through which the dispersion and vapor and/or condensed vapor leave the reactor housing.

It is characteristic of this device that the colliding jets of the preliminary dispersion meet one another in a gas space. This means that the collision point at which the jets meet one another is not situated on a vessel wall or on a tube wall. The hydrodynamic energy of the jets results in high shear and cavitation forces at the collision point of the jets. The aim of displacing the cavitation into a space clear of material is, firstly, the prevention of wear on materials. Secondly, there is the fact that the colliding jets are not decelerated by the surrounding gaseous atmosphere prior to their collision.

The nozzles can be adjusted to a common collision point. They consist of hard and thus low-wearing materials. These may include ceramics, such as oxides, carbides, nitrides or mixtures of these. In particular, aluminum oxide, preferably in the form of sapphire or ruby, diamond and hardened metals can be particularly suitable. The nozzles may have bores of a diameter of 0.5–2000 $\mu$m, preferably of 10 to 500 $\mu$m, particularly preferably of 50 to 200 $\mu$m. The diameter of the bores includes all values and subvalues therebetween, especially including 1, 5, 10, 50, 100, 200, 400, 600, 800, 1000, 1200, 1400, 1600 and 1800 $\mu$m.

The advantages of the process according to the present invention lie in the fact that the reaction chamber filled with water vapor, compared with a reaction chamber filled with liquid, minimizes the cavitation inside the reaction chamber and hence abrasion and wear on materials. Moreover, the use of water vapor, unlike in a process operated using an inert gas, results in an easy isolation of the dispersion after the dispersal, in particular where there are added dispersing agents and/or surface-active substances, which have a tendency to foam formation when gases are passed through.

Having generally described this invention, a further understanding can be obtained by reference to certain specific examples which are provided herein for purposes of illustration only, and are not intended to be limiting unless otherwise specified.

EXAMPLES

Analytical Method

The average secondary particle size was determined using a Zetasizer 3000 Hsa from Malvern.

The viscosity of the dispersions produced was determined using a rotary rheometer from Physica, Model MCR 300, and a measuring cup CC 27. The viscosity value was determined at a shear rate of 500 1/sec. This shear rate is within a range in which the viscosity is virtually independent of the shear stress.

Production of the Dispersions

Preliminary dispersion: 36 kg deionized water was placed in a 60 l high-grade steel batch tank. 16.5 kg aluminum oxide type C (DEGUSSA AG) was sucked up and coarsely predispersed with the aid of a dispersing and suction mixer from Ystrahl (at 4500 rpm). During the suction procedure, a pH value of 4.5 was established and maintained by addition of 50% acetic acid. After the introduction of the powder, the dispersion process was completed using a rotor/stator continuous homogenizer type Z 66 from Ystral, having four working wheels, a stator slot width of 1 mm and at a speed of 11 500 rpm. During this dispersion, carried out for 15 minutes at 11 500 rpm, the pH was established and maintained at a pH value of 4.5 by addition of further 50% acetic acid. A total of 570 g of 50% acetic acid was required and a solids concentration of 30 wt. % was established by addition of 1.43 kg water.

Dispersion: The preliminary dispersion was ground using a high-pressure homogenizer, Ultimaizer System from Sugino Machine Ltd., model HJP-25050, but with a three-jet chamber instead of the twin-jet chamber incorporated into the Ultimaizer System. (The Ultimaizer System was used only as a high-pressure pump.) Besides the outlet, this chamber also had an additional opening for the introduction of water vapor. The three-jet chamber divided the preliminary dispersion under high pressure into three substreams, which were each released through a diamond nozzle having a diameter of 0.25 mm. The three jets of the dispersion, issuing at a very high speed, met at a collision point and the dispersing/grinding effect aimed at was thus attained. As all three liquid jets lay on a common imaginary plane, the angle to the adjacent jet was 120° in each case.

The pressures chosen for grinding the aluminum oxide preliminary dispersion were 100 MPa, 175 MPa and 250 MPa during one grinding operation.

In order to maintain a grinding chamber filled with water vapor, water vapor at a temperature of 110° C. was fed into the grinding chamber. The vapor supply was adjusted according to the quantity of dispersion introduced, in order to ensure a vapor-filled grinding chamber. The dispersion was then cooled without difficulty by means of a conventional heat exchanger.

The dispersion was somewhat diluted as a result of the condensation of the water vapor supplied, with the solids concentration being correspondingly lowered.

Thus, at a pressure of 250 MPa a volumetric flow rate of the preliminary dispersion of 250 l/h was attained, which, where 2.5 kg vapor was introduced and the density of the preliminary dispersion was 1.26 kg/l, brought about a decrease in the solids concentration of from 30 wt. % to 29.7 wt. % (Dispersion D3).

Since, at the lower pressures, a lower volumetric flow rate of the preliminary dispersion through the diamond nozzles was obtained, the required quantity of vapor can also be decreased. Thus, at 100 MPa and the resulting volumetric flow rate of 160 l/h, a vapor supply of 1.8 l/h was sufficient (Dispersion 1) and at 175 MPa and the resulting volumetric flow rate of 215 l/h, a vapor supply of 2.2 kg/h was sufficient (Dispersion D2). Here, in the 100 MPa experiment an end concentration of 29.7 wt. % $Al_2O_3$ was attained, and in the 175 MPa experiment an end concentration of 29.8 wt. % $Al_2O_3$, was attained.

If a concentration of 30.0 wt. % is to be attained, then a correspondingly somewhat more highly concentrated preliminary dispersion is necessary.

The settings and analytical data for the dispersions are shown in the Table.

It is clear that the solids concentration decreases only slightly as a result of the presence of water vapor. Moreover, a better dispersion/grinding is achieved by a higher grinding pressure.

TABLE

Settings and analytical data of the aluminum oxide dispersions (1) produced using a three-jet chamber in an atmosphere of water vapor

| Dispersion | Pressure of preliminary dispersion MPa | Flow of preliminary dispersion l/h | Vapor supply kg/h | End concentration of dispersion wt. % | Particle diameter[2] nm | Viscosity mPa · s |
|---|---|---|---|---|---|---|
| D1 | 100 | 160 | 1.8 | 29.7 | 80 | 40 |
| D2 | 175 | 215 | 2.2 | 29.8 | 68 | 25 |
| D3 | 250 | 250 | 2.5 | 29.7 | 53 | 17 |

(1) Aluminum oxide preliminary dispersion: solids content 30 wt. %; density 1.26 kg/l; average particle diameter (number) 117 nm, viscosity 120 mPa · s;
[2] average particle diameter, based on number.

German patent application 102 04470.8, filed Feb. 5, 2002, is incorporated herein by reference.

Numerous modifications and variations of the present invention are possible in light of the above teachings. It is therefore to be understood that within the scope of the appended claims, the invention may be practiced otherwise than as specifically described herein.

The invention claimed is:

1. A process for producing a finely divided, stable dispersion of solids, comprising:
spraying at least two streams of a preliminary dispersion, each through a separate nozzle by pumps, onto a collision point in a reactor chamber enclosed by a reactor housing;
passing water vapor through an opening into said reactor chamber so that a vaporous atmosphere consisting only of water vapor prevails in said reactor chamber; and
removing the finely divided dispersion and a member selected from the group consisting of a) vapor, b) partially condensed vapor consisting mainly of water and c) a combination of a) and b) from said reactor chamber by excess pressure of an incoming water vapor on the gas inlet side;
wherein said solids have an average particle size ranging from 10 nm to 10 $\mu$m.

2. The process according to claim 1, wherein said preliminary dispersion comprises water, organic compounds or a mixture of water and organic compounds as a liquid phase.

3. The process according to claim 1, wherein said preliminary dispersion comprises a dispersing agent, a surface-active substance or both.

4. The process according to claim 1, wherein the solids content of said preliminary dispersion ranges from 1 and 70 wt. %.

5. The process according to claim 4, wherein the solids content of said preliminary dispersion ranges from 10 and 50 wt. %.

6. The process according to claim 5, wherein the solids content of said preliminary dispersion ranges from 20 and 40 wt. %.

7. The process according to claim 1, wherein said incoming water vapor is at a temperature which is at least at the boiling point of water at the pressure prevailing on said gas inlet side.

8. The process according to claim 1, wherein a pressure in said reactor chamber, without introduction of water vapor, corresponds to atmospheric pressure and an incoming water vapor is at a temperature of 100° C. or more.

9. The process according to claim 1, wherein said preliminary dispersion is sprayed into the reaction chamber under a pressure of at least 50 bar.

10. The process according to claim 9, wherein said preliminary dispersion is sprayed into the reaction chamber under a pressure of at least 500 bar.

11. The process according to claim 1, wherein a member selected from the group consisting of said finely divided dispersion, said vapor removed from said reaction chamber, said partially condensed vapor removed from said reaction chamber, and a mixture of a) said vapor removed from said reaction chamber and b) said partially condensed vapor removed from said reaction chamber are cooled after leaving said reactor chamber.

12. The process according to claim 1, wherein a final solids content of said finely divided dispersion can be established from the concentration of the solid in said preliminary dispersion and from a calculated quantity of condensed water vapor after leaving said reactor chamber.

13. The process according to claim 1, wherein a mixture of finely divided dispersion and vapor andlor condensed vapor obtained after leaving said reaction chamber, is sprayed repeatedly as such or mixed with said preliminary dispersion into said reaction chamber.

14. The process according to claim 1, wherein said solids are selected from the group consisting of an organic particle, an inorganic particle and mixtures thereof.

15. The process according to claim 1, wherein said pumps are high pressure pumps.

16. The process according to claim 1, wherein said preliminary dispersion has an average particle size of not more than 1 mm.

17. The process according to claim 1, wherein said preliminary dispersion comprises a monohydric or a dihydric alcohol.

18. The process according to claim 1, wherein said nozzle has a bore of a diameter of 0.5–2000 $\mu$m.

* * * * *